Oct. 18, 1932.    E. CHAGNIARD ET AL    1,883,552
AIRPLANE WING STRUCTURE AND METHOD OF MAKING THE SAME
Filed Oct. 5, 1929    3 Sheets-Sheet 2
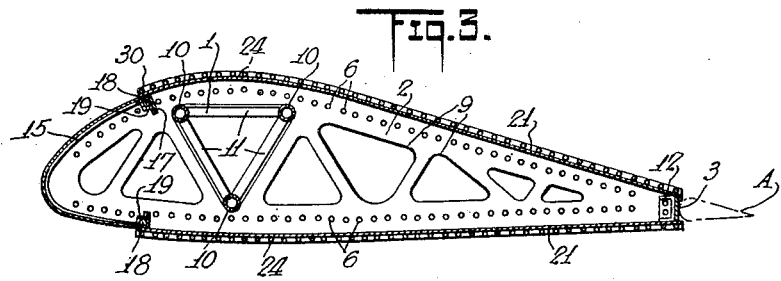
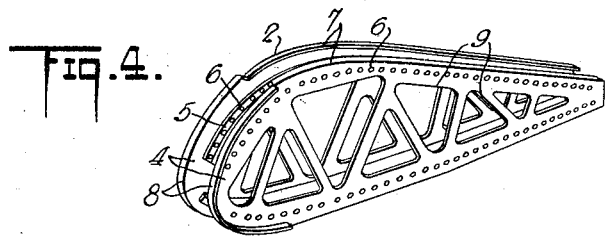
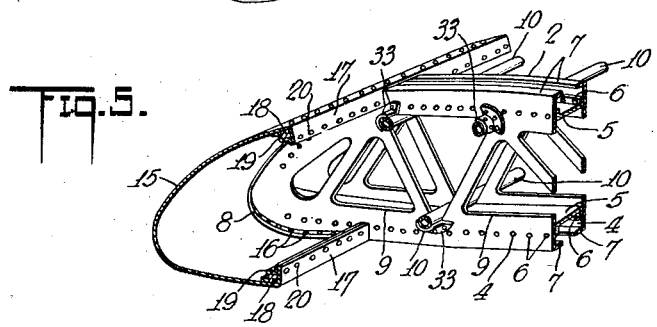
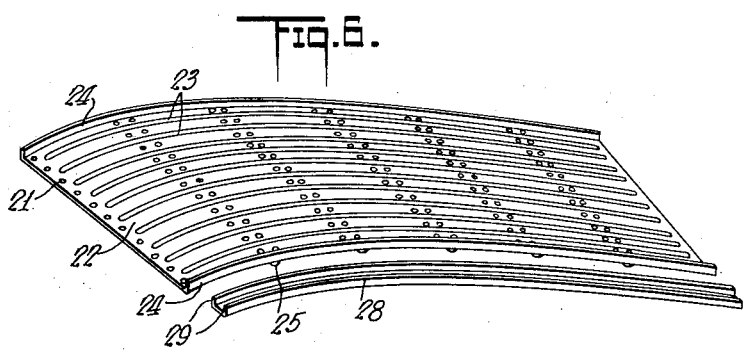
INVENTOR
Alexander Kartvelichvili
Edmond Chagniard
BY
Franklin J. Foster
ATTORNEY Oct. 18, 1932.  E. CHAGNIARD ET AL  1,883,552
AIRPLANE WING STRUCTURE AND METHOD OF MAKING THE SAME
Filed Oct. 5, 1929   3 Sheets-Sheet 3
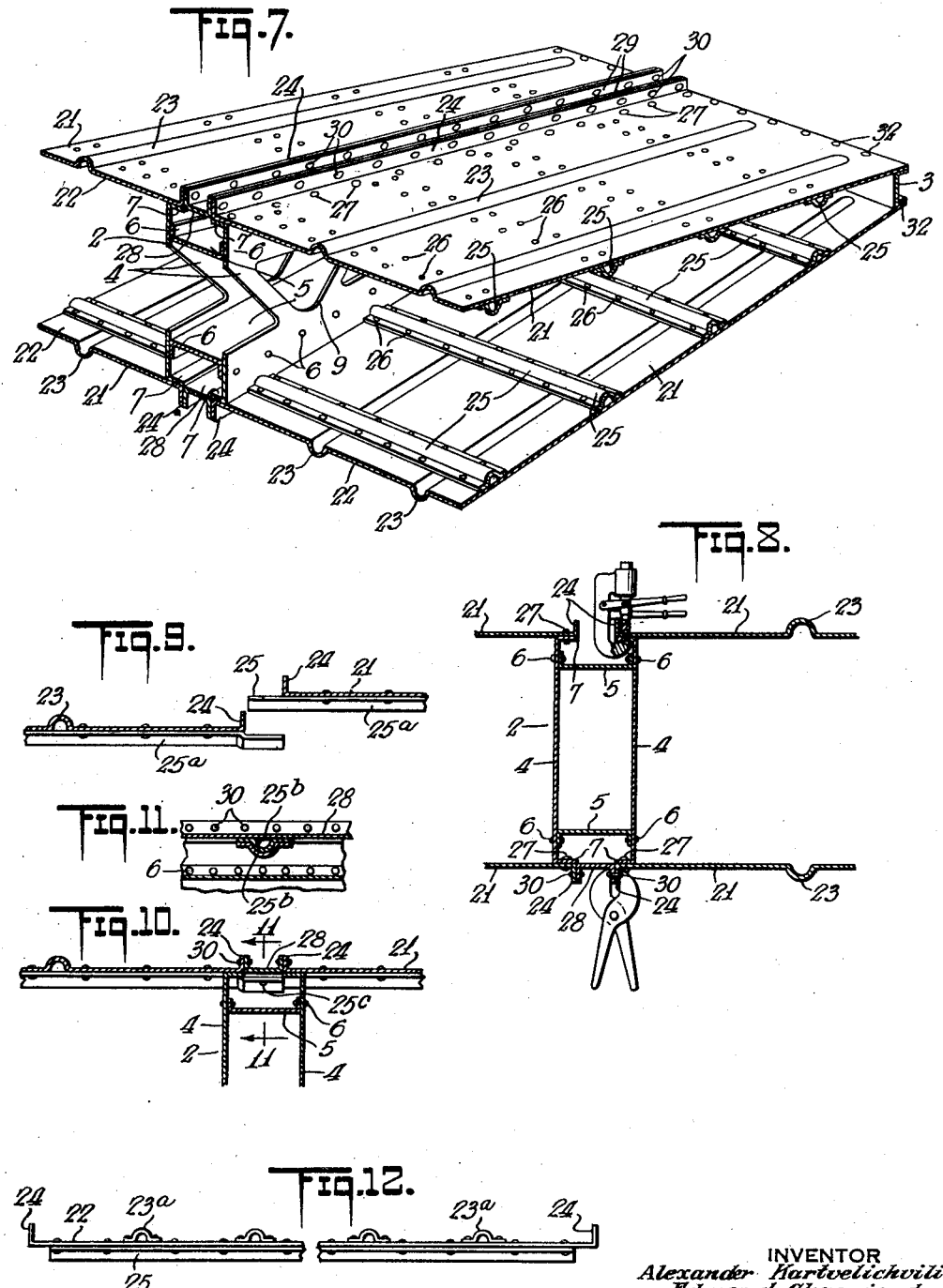
INVENTOR
Alexander Kartvelichvili
Edmond Chagniard
BY
Franklin J. Foster
ATTORNEY Patented Oct. 18, 1932

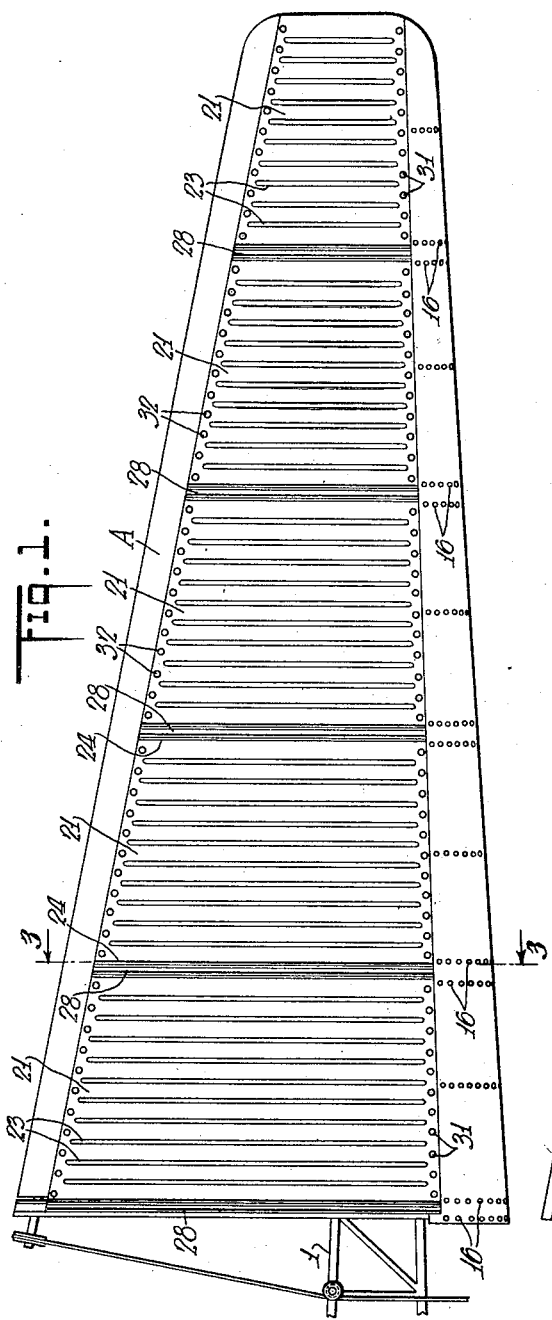
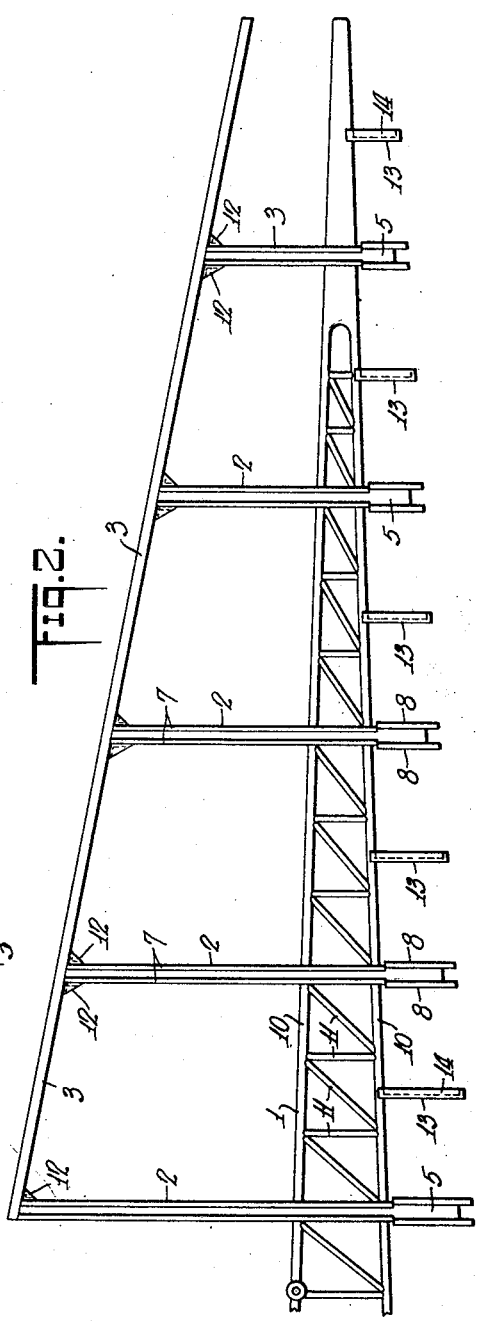

1,883,552

UNITED STATES PATENT OFFICE

EDMOND CHAGNIARD AND ALEXANDER KARTVELICHVILI, OF NEW YORK, N. Y., ASSIGNORS TO CHAGNKART INTERNATIONAL AVIATION CORPORATION, OF NEW YORK, N. Y., A CORPORATION OF NEW YORK

AIRPLANE WING STRUCTURE AND METHOD OF MAKING THE SAME

Application filed October 5, 1929, Serial No. 397,562, and in France November 30, 1928.

Our present invention, while capable of a wider range of usefulness, finds its preferred embodiment in metal aircraft construction and more especially relates to airplane wing structures.

An object of the invention is to provide a wing construction which will substantially eliminate present difficulties of manufacture, notably which will obviate the need for internal riveting.

This object is accomplished without sacrificing the structural strength of the wing, without resorting to the use of heavy or complex structure and in a manner which not only facilitates and expedites manufacture but lessens the cost of construction.

In a preferred embodiment of the invention a plurality of pre-fabricated metal panels are secured together and to an internal reinforcing frame in such a manner that a strong light hollow wing is formed.

External riveting is employed when assembling the panels and frame structure and strong seams are produced along all the lines of union of the assembled parts.

The invention may be more fully understood from the following description in connection with the accompanying drawings, wherein:

Fig. 1 a plan view of our improved airplane wing;

Fig. 2 a plan view of the frame structure with the shell removed;

Fig. 3 an enlarged sectional view, on the line 3—3 of Fig. 1;

Fig. 4 is a perspective view of one of the frame ribs;

Fig. 5 a sectional perspective view showing the mounting of the leading edge of the shell upon the frame;

Fig. 6 a detail perspective view of one of the shell-forming panel units and of one of the seam-forming strips for joining adjacent panels;

Fig. 7 a fragmentary sectional perspective view showing portions of the assembled shell and frame;

Fig. 8 is a sectional detail showing the manner of fastening the panels to the frame and to each other by external riveting;

Figs. 9 to 11 are sectional details showing modified forms of shell structure; and Fig. 12 is an edge view of a further modified form of panel.

In a preferred embodiment of the invention, the wing includes an internal framework consisting of a longitudinal spar or longéron 1, a series of spaced transverse metal ribs 2 secured to the spar and extending fore and aft, and a longitudinal metal beam 3 extending along the trailing edge of the wing and united to the rear ends of the ribs 2. A sectional metal shell covers the frame and is secured to the ribs, the latter being of proper contour to give the required shape to the completed airfoil. The ribs and the sections of the shell are designed for assembly by external riveting as will be more fully described hereinafter.

A single wing is shown and the spar 1 is broken away at its inner end although in practice it may extend through the fuselage and through the opposite wing. The fuselage and the manner of attaching my improved wing structure thereto do not in themselves form part of the present invention and are accordingly not shown.

Each rib member 2 is hollow in form and includes a pair of spaced parallel sheet metal side plates 4, substantially the same contour, required for the rib profile. Two channelled sheet metal spacer strips 5 of channel form extending most of the length of the plates between the latter and are spaced inwardly from the upper and lower edges of the plates for a purpose which will later appear. The side walls or flanges of the channel members are directed outwardly abutting the inner faces of the side plates, and riveted thereto as at 6. Along their upper and lower contour edges the side plates are formed with narrow longitudinal flanges 7, turned inwardly toward each other and with their opposed edges spaced a material distance apart for purposes of riveting operations to be described. In advance of the flanges 7 the side plates are formed with flanges 8 directed outwardly away from each other and extending around the noses of the plates. Between the strips 5 the side plates are apertured as at 9 to skeletonize them.

The spar 1 is also of skeleton form and of triangular cross section. It is formed of three longitudinal metal tubes 10 rigidly connected by tubular transverse metal braces or struts 11. The tubes 10 converge toward the wing tip, extend through suitable openings in the ribs 2 and are rigidly secured to the latter in any suitable manner. The design of the spar may be varied and additional spars may be employed in the frame structure if desired.

The rear longitudinal beam 3 is channelled with its flanges directed rearwardly. It extends inwardly from the wing tip, along the trailing edge, and is fixed to the rear ends of the ribs 2 by riveted corner clips 12.

A row of short, segmental sheet metal ribs 13, stiffen the leading edge of the wing, and are disposed forwardly of the spar 1. These ribs are disposed midway between the ribs 2 and conform to the nose profiles of the latter. They are rigidly joined at their rear ends to the spar 1 and are preferably formed with profile flanges 14.

The leading edge of the wing is formed by an elongated metal sheet 15 which forms part of the metal shell. This sheet is curved around the noses of the main ribs 2 and around the segmental ribs 13 and is riveted to them as at 16. It is the first member of the shell structure to be assembled on the frame and is thus readily accessible both inside and outside for convenient performance of the riveting work. At each of its rear edges the sheet is turned inwardly as at 17 and bears against two sides of a squared longitudinal beam 18. The latter may extend through the ribs 2, or may comprise short sections extending between the ribs. A longitudinal metal angle strip 19 covers the two remaining sides of each beam 18 and is formed with extended edge flanges which are riveted to the sheet 15 as at 20.

Rearwardly of the sheet 15, the upper and lower sides of the frame are covered by two series of panel units 21 disposed in succession along the length of the wing. In the present showing the wing tapers outwardly in plan so that the panels must be of different sizes. Each panel comprises a thin metal sheet 22, formed with a series of spaced parallel corrugations 23, extending substantially the full fore and aft depth of the panel, and forming stiffening ribs. The marginal side edges of sheets 22 are bent outwardly to form flanges 24 extending fore and aft, parallel to the corrugations. Disposed across the inner face of each sheet 22, transversely with respect to the corrugations 23, is a series of metal stiffening members 25 of channel form. These members are formed with outturned flanges which are riveted or otherwise secured as at 26 to the sheets 22. The corrugations 23 and the channel members 25 cooperate to render the panel substantially resistant to bending stresses in any direction.

The panel units, when assembled upon the frame, cover the spaces between the ribs and have their opposed flanged side edges spaced apart along the upper and lower edges of the ribs. The forward margin of each panel bears against the rear margin of the leading edge sheet 15 which is reinforced by the beams 18; the rear margin of each panel bears against the rear channel beam 3, and the flanged side edges 24 of the panels bear against the inturned flanges 7 of the plates 4. The opposed edge flanges 24 of adjacent panels are separated a distance corresponding to the space between the opposed rib flanges 7.

The panel units are completely prefabricated prior to their assembly to form the shell structure, and each is fastened upon the frame structure independently of the others. The design of the frame and that of the panels enable this to be done conveniently. In assembling the wing, each panel is placed in its proper position upon the frame and its side margins are riveted to the rib flanges 7 as at 27. The space between the opposed flanges 24 of adjacent panels and between the opposed flanges 7, together with the cross-sectional form of the rib to provide sufficient inward clearance to permit a riveting tool to be easily inserted into the rib. The riveting of the side margins of the panels can then be accomplished externally, as indicated in Fig. 8. Having finished this riveting, the spaces between opposed panel flanges 24 are closed by metal seam strips 28 of channel form. Each strip 28 is of substantially the same length as the panel edges between which it is disposed and of proper cross section to fit snugly between the opposed panel flanges 24, the sides or flanges 29 of the strip extending outward and abutting the flanges 24. The abutting flanges 24 and 29 are then externally riveted together as at 30.

Along their front margins the panels 21 and the seam strips 28 are secured to the sheet 15 and to the beams 18. Preferably the fastening means employed here are screws 31 applied from the outside and threaded into the beams 18. The rear margins of the panels overlie the rear channel beam 3 of the frame and are riveted thereto as at 32. The exposed sides or flanges of the beam 3 extend outwardly so that the riveting 32 can be easily done from the outside. Thus all of the shell parts are secured to the frame and joined together by externally applied fastening elements. While the use of rivets and screws is preferred, other suitable fastening means may be employed. After the fastening of the panels to the beam 3 the aileron A is mounted in any convenient manner upon the wing, directly to the rear of said beam. The outermost panels 21 are properly shaped to form the wing tip. In the completed wing structure the flanges and corrugations of the panels and the flanges of the seam strips all extend fore and aft avoiding disturbance in the movement of the air around the profile of the wing.

Any suitable means may be employed to rigidly join the ribs 21 to the spar 1 and hold them in proper position to support the shell structure. In Fig. 5 clips 33 in the nature of segmental collars are shown for this purpose. These clips are fixed to the longitudinal members 10 of the spar and to the side plates 4 of the ribs. They have been omitted from the main assembly views for the sake of clarity.

The assembled frame and shell form a light, strong wing structure. The various frame parts and the various parts of the shell are separately and conveniently constructed and are easily assembled and secured together, simplifying construction and minimizing cost. The design of the panel units, the ribs 2 and the seam structures between the panels contribute greatly to the wing strength. The panel units are made stiff and strong prior to assembly to avoid the need for a complicated frame structure for internally supporting and bracing the shell. Also, a strong tubular structure is provided by the design of the ribs 2 and the seam structure between the panels. A central tube is defined by the side plates 4 and the spacer strips 5 of each rib. Outwardly of the central tube two tubes are defined along the panel seams by the side plates 4, the spacer strips 5 and the seam strips 28. Thus a strong but light-weight, triple tube structure is produced at each rib. The metal employed throughout the wing structure is preferably duralumin, or an equivalent strong, light-weight material.

The inner stiffening members or cleats 25 of the panel units terminate short of the flanged side edges of the panels so that in the asembled wing they reach only to the outer sides of the ribs. In Figs. 9, 10, and 11, however, a slight modification is shown, the panels being provided with cleats 25ª having extensions 25ᵇ which reach beyond the panel edges and overlap within the ribs 2. The latter are notched at their edges to provide clearance for the cleats. These overlapping cleats contribute further to the strength of the wing. They are preferably riveted as at 25ᶜ.

In Fig. 12 is shown another slight modification of the panel unit. Here the external corrugations 23 are omitted and, cleats 23ª similar to cleats 25 are substituted and riveted to the outer face of the panel.

It will thus be seen that there is herein described apparatus in which the several features of this invention are embodied, and which apparatus in its action attains the various objects of the invention and is well suited to meet requirements of practical use.

As many changes could be made in the above construction, and many apparently widely different embodiments of this invention could be made without departing from the scope thereof, it is intended that all matter contained in the drawings shall be interpreted as illustrative and not in a limiting sense.

What we claim is:

1. In an aircraft wing structure an internal metal frame structure including tubular form defining rib members extending transversely of the wing an outer sectional sheet metal shell structure covering said frame structure and comprising a plurality of reinforced sheet metal panels of the one piece type bridging the space between adjacent ribs and individually and independently secured to the upper and lower edges of said transverse ribs of the frame structure by rivets applied and fastened at the exterior of the structure.

2. In an aircraft wing structure an internal metal frame structure including tubular form defining rib members extending transversely of the wing an outer sectional sheet metal shell structure covering said frame structure and comprising a plurality of one piece sheet metal panels individually and independently reinforced secured to the upper and lower edges of said transverse ribs of the frame structure, by rivets subjected almost entirely to shearing stresses and applied entirely at the outside of the structure.

3. In an aircraft wing structure an internal metal frame structure including tubular form defining rib members extending transversely of the wing an outer sectional sheet metal shell structure covering said frame structure and comprising a plurality of one piece sheet metal panels individually reinforced and each and independently secured to the upper and lower edges of said transverse ribs of the frame structure said panels having flanged lateral edges fastening means securing the panels along their marginal edges to the ribs, channelled metal seam strips joining the opposed edges of the panels directly in line with the ribs and forming with the ribs and the secured edges of the panels tubular truss members extending transversely of the wing.

4. In an aircraft wing structure an internal metal frame structure including tubular form defining rib members extending transversely of the wing an outer sectional sheet metal shell structure covering said frame structure and comprising a plurality of reinforced sheet metal panels individually and independently secured to the upper and lower edges of said transverse ribs of the frame structure, fastening means securing the panels along their marginal edges to the ribs, metal seam strips joining the opposed edges of the panels directly in line with the ribs and means cooperating with the ribs and the secured edges of the panels and the seam strips to define tubular truss members extending transversely of the wing and substantially within the ribs and fastening elements arranged along the seam strips and securing them to the panels.

5. An aircraft wing structure comprising an internal frame; an outer shell structure covering said frame and including a plurality of stiff panels mounted upon the frame with their adjoining edges spaced apart; supporting and seam-forming structures for the panels, each comprising outturned opposed flanges carried by adjoining panel edges and spaced apart, a flange carried by the frame and forming a ledge inwardly supporting one of two adjoining panels along the margin thereof at the base of its outturned flange, fastening elements securing said panel margin to its supporting ledge flange and applied through the space between the panels, a stiff seam strip closing the space between the opposed panel flanges and provided with outturned flanges abutting the panel flanges; and fastening elements securing together said abutting flanges.

6. An aircraft wing structure comprising an internal frame; an outer shell structure covering said frame and including a plurality of stiff sheet metal panels mounted upon the frame with their adjoining edges spaced apart; and supporting and seam-forming structures for the panels, each comprising outturned opposed flanges formed upon said adjoining panel edges, spaced apart and extending fore and aft, a flange carried by the frame and forming a ledge inwardly supporting one panel along the margin thereof extending along the base of its outturned flange, rivets securing said panel margin to its supporting ledge flange and applied through the space between the panels, a metal seam strip closing the space between the opposed panel flanges and formed with outturned flanges abutting the panel flanges, and rivets securing together said abutting flanges.

7. An aircraft wing structure comprising an internal frame; an outer shell structure covering said frame and including a plurality of stiff panels mounted upon the frame with their adjoining edges spaced apart; supporting and seam-forming structures for the panels each comprising outturned opposed flanges formed upon said adjoining panel edges and spaced apart and extending fore and aft, a flange carried by the frame and forming a ledge supporting one panel along the margin thereof extending along the base of its outturned flange, rivets securing said panel margin to its supporting ledge flange and applied through the space between the panels, a stiff seam strip closing the space between the opposed panel flanges and formed with outturned flanges abutting the panel flanges, rivets securing together said abutting flanges; and a tubular rib structure extending along each seam between the panels and formed by the frame and the seam structure together.

8. An aircraft wing structure comprising an internal frame structure; an outer, sectional shell structure covering said frame structure and including a plurality of stiff panels mounted upon the frame structure with their opposed edges spaced apart; a seam structure joining opposed panels to each other and to the frame, comprising opposed, spaced flanges formed upon the frame structure and contacting and inwardly supporting the panels along the inner margins of said opposed edges of the latter and secured to said margins, outturned opposed flanges carried by the opposed panel edges and spaced apart to give access to said frame flanges for the securing of the panel margins thereto, a cover strip closing the space between said outturned flanges and provided with outturned flanges abutting those of the panels and secured thereto.

9. An aircraft wing structure comprising an internal frame including a plurality of spaced transverse rib members extending fore and aft, and means holding them in fixed relation along the wing; an outer sectional shell structure covering said frame structure and including a plurality of stiff panels mounted upon the frame structure, the rib members of the frame being formed to support said panels along their opposed edges with said edges spaced apart a relatively short distance and formed also to provide inward clearance for the application of fastening elements from without to secure together the ribs and panels along the opposed edges of the latter; and seam-forming means joining together said opposed edges of the panels, filling the space therebetween and designed for fastening to the panels by externally applied fastening elements.

10. An aircraft wing structure comprising an internal frame including a plurality of substantially parallel rib members, and means holding them in fixed spaced relation; an outer sectional shell structure covering said frame structure and including a plurality of sheet metal panels mounted upon the frame structure, the rib members of the frame being formed to support said panels along their opposed edges with said edges spaced apart a relatively short distance and formed also to provide inward clearance, for the application of rivets from without to secure together the ribs and the panels along the opposed edges of the latter, outturned flanges carried by said opposed panel edges.

11. An aircraft wing structure comprising an internal frame including a plurality of substantially parallel rib members, and means holding them in fixed spaced relation; an outer sectional shell structure covering said frame structure and including a plurality of sheet metal panels mounted upon the frame structure, the rib members of the frame being formed to support said panels along their opposed edges with said edges spaced apart a relatively short distance and formed also to provide inward clearance, for the application of rivets from without to secure together the ribs and the panels along the opposed edges of the latter, outturned flanges carried by said opposed panel edges and a seam strip channel form filling the space between said flanges and fastened thereto by externally applied rivets.

12. In an aircraft wing structure, an internal frame structure including a transverse rib formed of two sheet metal side plates of substantially the same contour extending fore and aft alongside each other, means holding said plates in fixed spaced relation, and contour flanges formed along the opposite longitudinal edges of said plates, the flanges of the two plates extending toward each other and having their free edges opposed and spaced apart; an outer sectional shell structure covering the frame structure and including a plurality of stiff, sheet metal panels mounted upon the frame structure with the margins of their opposed edges supported by said rib flanges and the edges spaced apart; rivets securing together said margins and rib flanges, outturned spaced flanges formed upon the panels along said spaced edges thereof, metal channel strips filling the spaces between the rib flanges and having their side walls directed outwardly and abutting the rib flanges, and rivets fastening said abutting channel walls and panel flanges.

13. An airplane wing structure comprising an internal frame including a plurality of transverse sheet metal rib members extending fore and aft and having contours to give the wing its transverse profile, and a spar connecting said ribs together and holding them in spaced relation; forward contour flanges formed upon the noses of said ribs; a metal sheet curved around the rib noses to form the leading edge of the wing and riveted to said flanges; shell walls covering the upper and lower sides of the frame and each including a plurality of sheet metal panels bridging the spaces between the ribs and disposed with their opposed edges extending along the ribs; and seam structures extending along the ribs and designed for both the fastening of the panels individually to the ribs and the joining together of the opposed panel edges, by riveting performed from the outside of the wing.

14. An airplane wing structure comprising an internal frame including a plurality of transverse sheet metal rib members extending fore and aft and having contours to give the wing its transverse profile, and a spar connecting said ribs together and holding them in spaced relation; forward contour flanges formed upon the noses of said ribs; a metal sheet curved around the rib noses to form the leading edge of the wing and riveted to said flanges; shell walls covering the upper and lower sides of the frame and each including a plurality of sheet metal panels disposed with their opposed edges extending along the ribs; and seam structures extending along the ribs and designed for both the fastening of the panels individually to the ribs and the joining together of the opposed panel edges, by riveting performed from outside of the wing, the ribs being formed to cooperate with said seam structures to form tubular reinforcements extending along the seams.

15. An aircraft wing structure comprising an internal frame including a plurality of sheet metal transverse rib members to extend fore and aft and having contours to give the wing its transverse profile; a spar to connect together said ribs and hold them spaced apart; contour flanges formed upon the ribs and extending along the longitudinal edges thereof in pairs, the flanges of each pair having there edges spaced apart and opposed and the ribs being formed to provide clearance at the inner faces of said flanges to riveting work by a tool inserted between the spaced flange edges from without; a plurality of separately formed sheet metal panel units to cover the upper and lower sides of the frame, means carried by each panel to stiffen its area, and outturned flanges carried by each panel and extending along opposite sides thereof, said panels being adapted to be mounted upon the frame with their opposed flanged edges spaced apart and their margins supported by the rib flanges and riveted thereto; and metal seam strips of channel form adapted to be mounted between the panel flanges and fastened thereto by external riveting.

16. An aircraft wing structure comprising an internal frame structure; an outer sectional shell structure covering said frame structure and including a plurality of sheet metal panels secured upon the frame structure with their opposed edges spaced apart, the frame structure being designed for the fastening of the panels thereto along the margins of their opposed edges by rivets applied through the space between said edges; a closure member closing said space and secured to the opposed panels, said panels and closure member being designed for attachment to each other by rivets applied entirely outside of the shell.

17. An aircraft wing structure comprising an internal frame structure including a plurality of sheet metal ribbed members extending fore and aft; an outer, sectional shell structure covering said frame structure and including a plurality of one piece stiffened sheet metal panel units bridging the spaces between adjacent ribs; and seam-forming means providing for the fastening of the panel units individually to the ribs and for the joining together of opposed edges of the panels, both by riveting operation performed from outside of the wing.

18. An aircraft wing structure comprising an internal frame including a plurality of transverse rib members extending fore and aft, and means holding them in fixed spaced relation along the wing; an outer, sectional shell structure covering said frame structure and including a plurality of stiffened, sheet metal panel units mounted upon the frame structure; and seam-forming means providing for the fastening of the panel units individually to said ribs along the longitudinal edges of the latter and for the joining together of opposed edges of the panels, both riveting operations performed from outside of the wing structure.

19. An aircraft wing structure comprising a frame including a longitudinal metal channel beam extending along the trailing edge of the wing and disposed with its sides directed rearwardly; metal sheets covering the upper and lower sides of the frame with their rear edge margins bearing against the rearwardly directed flanges of the channel beam and the beam interposed between said sheets; and longitudinal rows of rivets securing said sheet margins to the sides of the beam, the channel form of the latter providing for the application of said rivets entirely from the outside.

20. The method of constructing the wing of an airplane, consisting in constructing an internal frame; separately constructing a plurality of stiff sheet metal panel units; placing said panel units upon the frame when apart; fastening the panel units to the frame by riveting performed from the outside, by the insertion of a tool between said opposed panel edges; mounting a seam strip between the opposed panel edges after the riveting of the panels, to fill the space therebetween; and securing said seam strip to the opposed panel edges by rivets applied entirely outside of the wing.

Signed at New York city, in the State and county of New York, this 18th day of September, 1929.

EDMOND CHAGNIARD.
ALEXANDER KARTVELICHVILI.